US009941941B2

(12) United States Patent
Olsson et al.

(10) Patent No.: US 9,941,941 B2
(45) Date of Patent: Apr. 10, 2018

(54) SYSTEM FOR EVALUATION OF MIMO ANTENNA DEPLOYMENT

(71) Applicant: TELEFONAKTIEBOLAGET LM ERICSSON (PUBL), Stockholm (SE)

(72) Inventors: Bengt-Erik Olsson, Hovås (SE); Lei Bao, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/112,744

(22) PCT Filed: Jan. 27, 2014

(86) PCT No.: PCT/EP2014/051552
§ 371 (c)(1),
(2) Date: Jul. 20, 2016

(87) PCT Pub. No.: WO2015/110180
PCT Pub. Date: Jul. 30, 2015

(65) Prior Publication Data
US 2016/0344457 A1 Nov. 24, 2016

(51) Int. Cl.
*H04B 7/0426* (2017.01)
*H04B 7/0413* (2017.01)
(Continued)

(52) U.S. Cl.
CPC ......... *H04B 7/0426* (2013.01); *H04B 7/0413* (2013.01); *H04B 7/0465* (2013.01); *H04B 7/0682* (2013.01); *H04B 17/15* (2015.01)

(58) Field of Classification Search
CPC .... H04B 7/0426; H04B 17/15; H04B 7/0413; H04B 7/0465; H04B 7/0682
See application file for complete search history.

(56) References Cited

U.S. PATENT DOCUMENTS

2005/0141407 A1* 6/2005 Sandhu ............... H04L 25/0204
370/203
2009/0180466 A1 7/2009 Soul et al.
(Continued)

FOREIGN PATENT DOCUMENTS

EP 2 219 310 A1 8/2010

*Primary Examiner* — Janice Tieu

(57) ABSTRACT

The present disclosure relates to a radio receiver, a radio transmitter, and methods for evaluating multiple-input multiple-output, MIMO, antenna deployment. The method for evaluating MIMO, antenna deployment comprises the steps of receiving a first composite signal via a first receive antenna. The first composite signal comprises a first tone transmitted from a first transmit antenna at a first variable frequency and a second tone transmitted from a second transmit antenna at a second variable frequency different from the first variable frequency, and also receiving a second composite signal via a second receive antenna. The second composite signal comprising the first tone transmitted from the first transmit antenna and the second tone transmitted from the second transmit antenna. The method also comprises determining a first power signal from the first composite signal, and determining a second power signal from the second composite signal, as well as determining a phase difference between the phase of the first power signal and the phase of the second power signal, and evaluating MIMO antenna deployment based on the determined phase difference.

15 Claims, 3 Drawing Sheets

(51) Int. Cl.
    *H04B 17/15*     (2015.01)
    *H04B 7/04*     (2017.01)
    *H04B 7/06*     (2006.01)

(56) References Cited

U.S. PATENT DOCUMENTS

2009/0296846 A1    12/2009  Maru
2014/0185498 A1*  7/2014  Schwent .............. H04B 1/0057
                                                370/297
2014/0192845 A1*  7/2014  Szini .................... H04B 7/0413
                                                375/219

\* cited by examiner

SYSTEM FOR EVALUATION OF MIMO ANTENNA DEPLOYMENT

TECHNICAL FIELD

The present disclosure relates to a radio transmitter, a radio receiver, and methods for evaluating multiple-input multiple-output, MIMO, antenna deployment.

BACKGROUND

MIMO technology offers the possibility of significantly increasing the transmission capacity of a radio channel. It is a technique which is extensively used in radio access systems such as wireless local area networks, WLANs, and long-term evolution, LTE, mobile networks.

MIMO technology can also be applied to increase transmission capacity in high frequency point-to-point microwave radio links. This type of MIMO system as a rule uses highly directive antennas and operates in line-of-sight, LOS, conditions. A MIMO system operating under these conditions is often referred to as a LOS-MIMO communication system.

A difference between LOS-MIMO systems and traditional MIMO systems is that a LOS-MIMO system, having highly directive antennas and operating in LOS conditions, as a rule cannot make use of multipath propagation in order to perform the MIMO signal processing required to recover transmitted data. Instead, a LOS-MIMO communication system relies on a diversity of phase shifts along the different propagation paths between transmitter and receiver antennas, and not on multipath propagation. These phase shifts must satisfy certain conditions in order for a LOS-MIMO receiver to be able to recover transmitted data, i.e., the phase shifts must together provide a MIMO channel matrix which has full rank.

Thus, in order for a LOS-MIMO communication system to function as intended, inter-antenna distances must be carefully set as a function of transmission frequency in order to provide suitable phase shifts along the different propagation paths between transmit and receive antennas, which phase shifts allow a LOS-MIMO receiver to recover transmitted data.

Consequently, a correct antenna deployment is necessary in order for a LOS-MIMO communication system to be able to provide said increase in transmission capacity.

A problem then, is how to find such a suitable LOS-MIMO antenna deployment for a given environment and transmission frequency band.

One possible approach to evaluating a LOS-MIMO antenna deployment in order to see if it is suitable for MIMO communication is to actually deploy the full LOS-MIMO communication system including antennas, modems and power supply, and then measure the phase differences between the different propagation paths, which phase differences can typically be calculated by a LOS-MIMO system receiver or digital signal processor, DSP.

A drawback with this approach is that the MIMO communication system has to be fully installed and operational, meaning that any subsequent modification of antenna positions is likely to be difficult and expensive to accommodate. Also, a sufficiently good antenna deployment must be achieved from the start in order for the MIMO system receiver to be able to acquire the transmitted signal and measure said phase differences.

Another approach is to measure the exact locations in three dimensions of a planned set of antenna positions using, e.g., a Global Positioning System (GPS) tool and then calculate phase differences between said propagation paths from the inter-antenna distances and the transmission frequency. However, in reality, it can be difficult to obtain sufficient accuracy in such GPS measurements, e.g., due to that antenna locations are at positions with an obscured view of the sky. Also, this approach does not account for phase shifts which are due to effects other than phase shift from propagation distance, e.g., phase shift effects due to multipath and other environmental effects on received phase.

Consequently, there is a need for a tool which allows quick and cost-effective, and yet precise, evaluation of the suitability of a given set of antenna positions, i.e., a LOS-MIMO antenna deployment, for use in a LOS-MIMO communication system.

SUMMARY

An object of the present disclosure is to provide methods and apparatus' which seek to mitigate, alleviate, or eliminate one or more of the above-identified deficiencies in the art and disadvantages singly or in any combination and to provide an improved system for evaluation of MIMO antenna deployment.

This object is in an embodiment obtained by a method, performed in a radio receiver, for evaluating multiple-input multiple-output, MIMO, antenna deployment. The method comprises the steps of receiving a first composite signal via a first receive antenna. The first composite signal comprising a first tone transmitted from a first transmit antenna at a first variable frequency and a second tone transmitted from a second transmit antenna at a second variable frequency different from the first variable frequency. The method also comprises receiving a second composite signal via a second receive antenna. The second composite signal comprises the first tone transmitted from the first transmit antenna and the second tone transmitted from the second transmit antenna. The method also comprises determining a first power signal from the first composite signal, and determining a second power signal from the second composite signal, as well as determining a phase difference between the phase of the first power signal and the phase of the second power signal, and then evaluating MIMO antenna deployment based on the determined phase difference.

Thus, a given MIMO antenna deployment can, as will be made apparent from the present disclosure, be evaluated in a quick, cost-effective and precise manner, which is an advantage.

The use of said first and second tones separated in frequency is advantageous in that the resulting received signal combinations, i.e., the first and the second composite signals, will have envelops which exhibit a beating, i.e., received signal magnitudes will vary deterministically with time. This beating is due to said separation in frequency between the first and the second tone, and can be analyzed in a quick and cost-effective manner and used to determine whether a given antenna deployment is suitable for MIMO communication or not.

Further, the disclosed method can be applied to evaluate a given MIMO antenna deployment prior to a full MIMO system deployment, since it does not necessarily involve demodulating received composite signals, but merely determining first and second power signals from the received first and second composite signal. This is an advantage.

Also, the disclosed method can be advantageously applied to evaluate MIMO antenna deployments which are severely sub-optimal, such as MIMO antenna deployments which yield a rank defect MIMO channel matrix. This is due to that no actual demodulation nor is detection of information carried by received composite signals necessary according to the present teaching, as opposed to an antenna evaluation system based on a full-fledged MIMO communication system which requires a MIMO channel matrix that has full rank. In other words, according to the present teaching no MIMO signal processing relying on a full rank channel matrix is required for evaluation of antenna deployment, but only signal processing for determining the first and second power signals, which is an advantage.

According to an aspect, the first and second power signals constitute the envelopes of the first and second composite signals, respectively.

According to yet another aspect, the step of determining a first power signal comprises applying a square-law detector to the first composite signal, and the step of determining a second power signal comprises applying a square-law detector to the second composite signal.

Using envelopes as power signals is advantageous, since generating an envelope signal from a received signal can be done in a cost-effective manner with no significant implementation complexity, e.g., by using a square-law detector.

According to a further aspect, at least one of the square-law detectors comprises a Schottky diode.

As was mentioned above, the use of a square-law detector, e.g., a Schottky diode, to determine a power signal is advantageous in that it permits a cost effective implementation of low complexity.

According to an aspect, at least one square-law detector is arranged to be mounted directly onto the corresponding receive antenna.

By mounting the at least one square-law detector directly onto the antenna at least two advantages are obtained. First, any complexity added by additional components is avoided, yielding a low complexity implementation. Second, any distortion introduced by additional components in-between antenna and detector is avoided, which is an advantage due to increased precision in evaluating MIMO antenna deployment.

According to another aspect, the method further comprises the step of presenting the determined phase difference between the first and second power signals to a user.

Thus, by the feature of presenting the determined phase difference to a user, a user of the system can perform evaluation of MIMO antenna deployment in real-time and does not have to wait for any additional data processing before evaluation results can be had. This is an advantage.

According to a further aspect, the step of determining a phase difference further comprises determining a sequence of phase differences corresponding to a pre-determined sequence of first and second frequencies over a pre-determined frequency band.

By the feature of determining a sequence of phase differences, the frequency dependency of a given MIMO antenna deployment can be evaluated. This is especially advantageous in wide-band MIMO applications, where the suitability of an antenna deployment can vary over a frequency band intended for communication.

According to an aspect, the radio receiver constitutes part of a line-of-sight, LOS, MIMO communication system.

The object of the present disclosure is in another embodiment obtained by a method, performed in a radio transmitter arranged for transmission of signals to a radio receiver, the radio receiver being arranged for evaluating multiple-input multiple-output, MIMO, antenna deployment, the method comprising the steps of generating a first signal, the first signal comprising a first tone at a first variable frequency, and generating a second signal, the second signal comprising a second tone at a second variable frequency different from the first variable frequency. The method also comprising the steps of transmitting the first signal via a first transmit antenna, and transmitting the second signal via a second transmit antenna.

A number of advantages are obtained by use of the above disclosed method. By the presently disclosed method, a given MIMO antenna deployment can be evaluated in a quick and cost-effective manner, which is an advantage.

Further, the disclosed method can be applied to evaluate a given MIMO antenna deployment prior to a full MIMO system deployment, since it does not necessarily involve any actual MIMO signal processing, but merely the generation and transmission of first and second signals, which signals can be generated without having access to a full-fledged MIMO communication transmitter system. This is an advantage.

Also, the disclosed method can be applied to evaluate MIMO antenna deployments which are severely sub-optimal, which is an advantage. This is again due to that no actual MIMO signal processing is required to be performed by the radio transmitter of the present disclosure, but only the transmission of first and second signals, which is an advantage.

According to one aspect, the first tone and the second tone are arranged to be generated from a common source tone at a third variable frequency.

Using a common source tone for the generation of first and second signals brings the advantage of phase synchronicity between first and second signals, which can be advantageously exploited by a receiver of said transmitted signals.

According to another aspect, the method further comprises the step of sweeping the first and the second variable frequency synchronously over a pre-determined frequency band.

By the feature of sweeping the first and the second variable frequency synchronously over a pre-determined frequency band, a frequency dependency of a given MIMO antenna deployment can be evaluated. This is especially advantageous in wide-band LOS-MIMO applications, where the suitability of an antenna deployment can vary over said wide frequency band.

According to yet another aspect, the radio transmitter constitutes part of a line-of-sight, LOS, MIMO communication system.

The object of the present disclosure is in yet another embodiment obtained by a radio transmitter for evaluating a multiple-input multiple-output, MIMO, antenna deployment. The radio transmitter comprises a transmitter module arranged to generate a first and a second signal. The first signal comprises a first tone at a first variable frequency. The second signal comprises a second tone at a second variable frequency different from the first variable frequency. The radio transmitter also comprises a first and a second transmit antenna. The radio transmitter is arranged to transmit the first signal via the first transmit antenna, and to transmit the second signal via the second transmit antenna.

The object of the present disclosure is in a further embodiment obtained by a radio receiver for evaluating a MIMO antenna deployment. The radio receiver comprises a receiver module arranged to receive a first composite signal via a first receive antenna, and also to receive a second composite signal via a second receive antenna. The first and the second composite signals both comprises a first tone at a first variable frequency and a second tone at a second variable frequency different from the first variable frequency. The receiver module also comprises a first and a second detector unit. The first detector unit is arranged to receive the first composite signal from the first receive antenna, and to determine as well as to output a first power signal. The second detector unit is arranged to receive the second composite signal from the second receive antenna, and to determine as well as to output a second power signal. The receiver module also comprises a determining unit arranged to receive the first and second power signals, and to determine a phase difference between the phases of the first and second power signals.

The radio receiver and radio transmitter display advantages corresponding to the advantages already described in relation to the methods.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
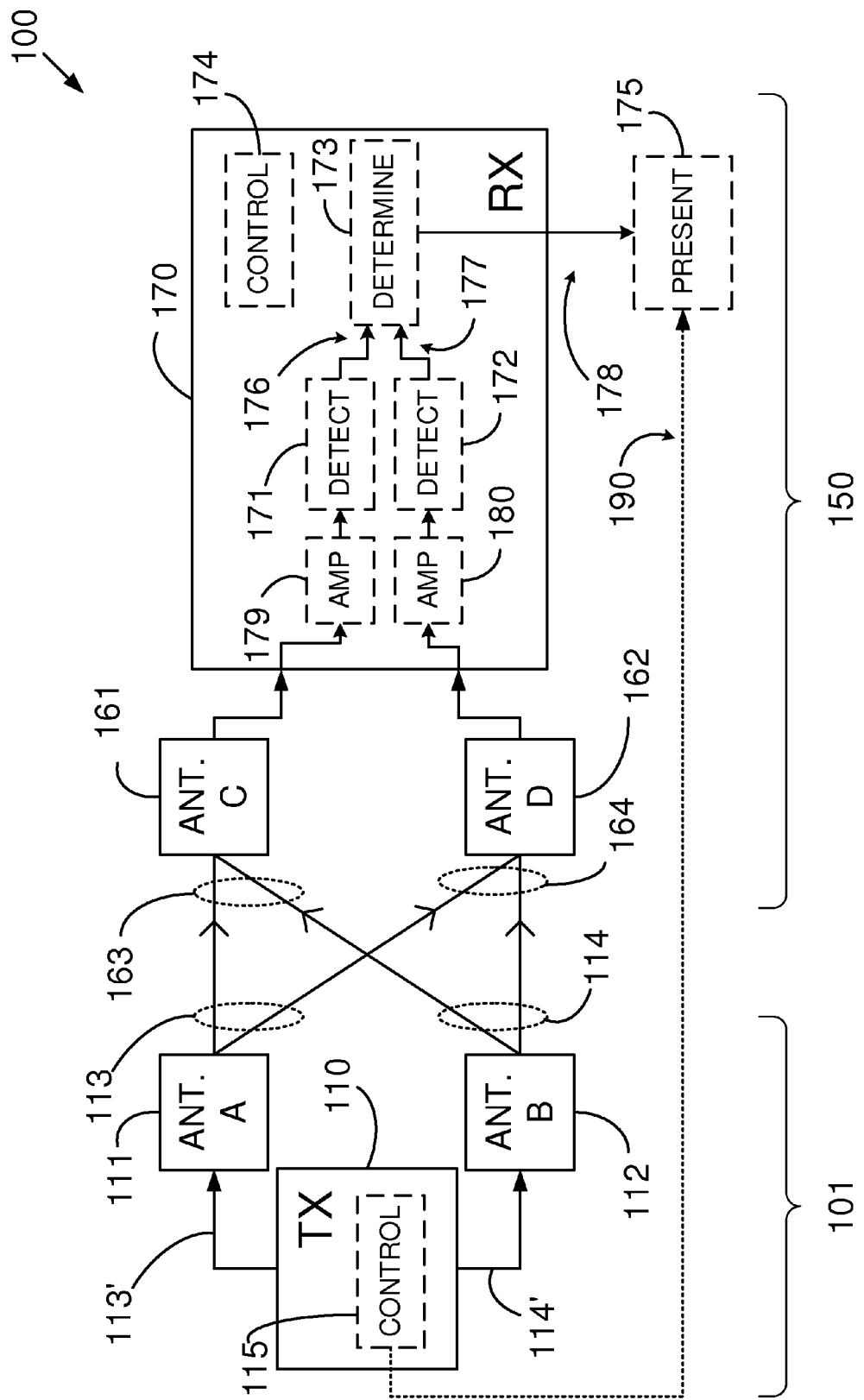
FIG. 1 schematically shows embodiments of communication systems of the disclosure.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

FIG. 1 shows a communication system 100 comprising a radio transmitter 101 and a radio receiver 150. The radio transmitter 101 comprises a transmitter module 110 arranged to generate a first 113' and a second 114' signal. The first signal 113' comprises a first tone at a first variable frequency, and the second signal 114' comprises a second tone at a second variable frequency.

A key point of the present disclosure is that the second variable frequency is different from the first variable frequency at any given point in time. Thus, at any given time instant, the first and second variable frequencies always differ by some given value.

It is further noted that the first and second variable frequencies can be varied, or swept, over a given frequency band. Consequently the first and second variable frequencies can assume the same frequency value, but not at the same time.

According to one aspect, the first and the second signal which are arranged to be transmitted from the transmitter antennas are arranged to be swept over the same frequency range at the same time but with a given offset in time, e.g., by using a common source signal from a shared signal synthesizer. Thus the instantaneous frequencies in the first and in the second signal will differ at any given point in time.

According to another aspect, the first and the second signal which are arranged to be transmitted from the transmitter antennas are arranged to be swept over different frequency ranges. Thus the instantaneous frequencies in the first and in the second signal will differ at any given point in time.

For practical reasons the frequency difference between the first and second tones, i.e., the difference between the first and the second variable frequency, should preferably be small compared to the first and second variable frequency, e.g., in the range of kHz for GHz frequency tones, but in principle any frequency separation between tones can be used. It is further preferred to use a fixed frequency separation between the first and the second tone. However, using a fixed frequency separation between tones is not necessary, and the frequency separation between the first and the second tone can also be varied.

The radio transmitter 101 also comprises a first 111 and a second 112 transmit antenna, also marked as antenna A and antenna B in FIG. 1. The radio transmitter 101 is arranged to transmit the first signal 113 via the first transmit antenna 111, and to transmit the second signal 114 via the second transmit antenna 112.

Thus, each of the first composite signal 163 and the second composite signal 164 comprises a first tone at a first variable frequency and a second tone at a second variable frequency, the second variable frequency being different from the first variable frequency.

The radio transmitter 101 is arranged to be controlled by a control unit 115.

A radio receiver 150 is also shown in FIG. 1. The radio receiver 150 is arranged to receive the signals transmitted from the radio transmitter 101. Towards this end, the radio receiver 150 comprises a receiver module 170 arranged to receive a first composite signal 163 via a first receive antenna 161, and also to receive a second composite signal 164 via a second receive antenna 162.

The first composite signal 163 comprises a combination, or sum, of the first and the second signal transmitted from the transmitter 101. The second composite signal 164 also comprises a combination of the first and the second signal transmitted from the transmitter 101, but with a different phase relationship, due to the different propagation path lengths, or inter-antenna distances.

When the communication system 100 is used in a line-of-sight MIMO, LOS-MIMO, application, the relative positions of antennas are important in order to reach full performance of the LOS-MIMO system. The underlying reason for this importance of relative antenna positions is that the relative phase differences of the different propagation paths essentially determine if, and how well, information transmitted from the different transmit antennas can be recovered at the receiving end by processing the signals received on the different receive antennas.

Henceforth, we denote the phase shift on a propagation path from an antenna X to an antenna Y by $\varphi_{XY}$. The phase shift $\varphi_{XY}$ is essentially determined by the transmission frequency, i.e., transmission wavelength, and the distance between antenna X and antenna Y. For a LOS-MIMO system having transmit antennas A and B, and receive antennas C and D, it can be shown that a suitable antenna deployment, i.e., a suitable set of antenna A, B, C, and D positions give rise to phase shifts on the different propagation paths which substantially satisfy:

$$|\Delta\varphi_C - \Delta\varphi_D| = 180°.$$

where $\Delta\varphi_C = \varphi_{AC} - \varphi_{BC}$ and $\Delta\varphi_D = \varphi_{AD} - \varphi_{BD}$.

If this condition substantially holds true, then a first information signal transmitted from, e.g., antenna A can be recovered at the receiver by processing signals received on antennas C and D without loss of signal quality, despite the fact that another interfering second information signal is transmitted in the same frequency band, and at the same time, as the first information signal but from antenna B. A deviation from the condition $|\Delta\varphi_C-\Delta\varphi_D|=180°$ implies degradation in receiver performance. However, a slight deviation, e.g., on the order of a few degrees, often result in a negligible performance degradation.

The receiver module 170 further comprises a first 171 and a second 172 detector unit. The first detector unit 171 is arranged to receive the first composite signal from the first receive antenna 161, and to determine as well as to output a first power signal 176. The second detector unit 172 is arranged to receive the second composite signal from the second receive antenna 164, and to determine as well as to output a second power signal 177.

The first 176 and the second 177 power signals are according to different aspects derived from the first 163 and from the second 164 composite signal, respectively, using different functions, which functions will be described below.

A fundamental concept of the present disclosure is to utilize beating between two radio frequencies, RF, signals in a power detector at each of the receiving antennas in order to measure a phase difference or relationship between two or more received RF signals. Consequently, the first 176 and second 177 power signals are according to one aspect determined as the envelopes of the first 163 and second 164 composite signals, respectively. According to another aspect, the first 176 and second 177 power signals constitute an even power of the envelopes of the first 163 and second 164 composite signals, respectively, i.e., the squares of the composite signals, or the composite signals 163, 164 raised to a power of four.

Thus, according to one aspect, the determining of the first power signal 176 comprises applying a square-law detector to the first composite signal 163, and the determining of the second power signal 177 comprises applying a square-law detector to the second composite signal 164. According to one aspect, said square-law detector comprises a Schottky diode.

The detectors units 171, 172 are according to aspects mounted directly onto the corresponding antenna. Thus, according to one aspect, a square-law detector is arranged to be mounted directly onto the corresponding receive antenna 161, 162.

However, in FIG. 1, an amplifier unit 179, 180 is shown which according to aspects precedes each of the detector units 171, 172. These amplifier units are arranged to amplify the received composite signals prior to determining said power signals, in order to improve received signal quality.

Thus, according to an aspect, the receiving of the first composite signal 163 comprises amplifying the received first composite signal 163 by a first amplifier unit 179, and the receiving of the second composite signal 164 comprises amplifying the received second composite signal 164 by a second amplifier unit 180.

In order to further improve received signal quality of the first 163 and of the second 164 received composite signals the radio receiver 150, according to an aspect, further comprises a first and a second band-pass filter (not explicitly shown in FIG. 1), said first and second band-pass filters being arranged to pass a first tone at a first variable frequency and a second tone at a second variable frequency.

In order to further clarify the theory behind the present teaching, suppose that each of the transmitting antennas 111, 112 are fed with a single frequency tone at almost the same frequency as the future LOS-MIMO communication system is supposed to operate at but with slightly different frequency than the other antenna. In other words, suppose antenna A transmits at frequency $f_A$ and that antenna B transmits at frequency $f_B$, and that the small frequency difference is $\Delta f=|f_A-f_B|$.

Suppose also that the detector units 171, 172 each comprise a square law power detector, e.g., a microwave Schottky diode. It is preferred to mount detector units 171, 172 as close as possible to the antenna, i.e., with as few components as possible in-between antenna and detector, in order to detect the received signal as close as possible to the point where the transmitted signals from antenna A and antenna B are combined.

After square law detection of the first composite signal 163 received at antenna C, a beating component of the two RF signals is obtained according to:

$$(\cos(f_A t+\varphi_{AC})+\cos(f_B t+\varphi_{BC}))^2 \approx 2\cos((f_A-f_B)t+(\varphi_{AC}-\varphi_{BC})),$$

Where t represents time, $\varphi_{AC}$ and $\varphi_{BC}$ are the acquired phases after transmission from antenna A and B, respectively, over the air to antenna C. This is the first power signal 176. In the same way one can derive the output of the power detector at antenna D, i.e., the second power signal 177, as $$2\cos((f_A-f_B)t+(\varphi_{AD}-\varphi_{BD})),$$

where $\varphi_{AD}$ and $\varphi_{BD}$ are the acquired phases after transmission from antenna A and B, respectively, over the air, to antenna D.

For simplicity we now write the resulting power signals from the two power detectors, i.e., the first 176 and the second 177 power signal, as $$P_C=\cos(\Delta f t+\Delta\varphi_C) \text{ and } P_D=\cos(\Delta f t+\Delta\varphi_D), \text{ respectively,}$$

where $\Delta\varphi_C=\varphi_{AC}-\varphi_{BC}$, and $\Delta\varphi_D=\varphi_{AD}-\varphi_{BD}$.

We have now normalized the amplitude of the two power signals, keeping only the frequency difference $\Delta f$ between tones and the phase differences $\Delta\varphi_C$, $\Delta\varphi_D$ after propagation from the transmitter antennas A and B to the two receiving antennas C and D. It is from these beating signals, or power signals, that a given MIMO antenna deployment can be evaluated, as will be shown below.

In order to perform said evaluation, the receiver module 170 comprises a determining unit 173 arranged to receive the first 176 and second 177 power signals, and to determine a phase difference 178 between the phases of the first 176 and second 177 power signals.

As explained above, when antennas of the communication system 100 is used in a line-of-sight MIMO, LOS-MIMO, application, the relative positions of antennas are important in order to reach the full performance of the LOS-MIMO system. For optimum LOS-MIMO receiver performance we had, as discussed above, the condition $|\Delta\varphi_C-\Delta\varphi_D|=180°$. The phase difference between power signals, i.e., $|\Delta\varphi_C-\Delta\varphi_D|$ can be determined by comparing the two received low frequency power signals with frequency $\Delta f$.

Detecting and analyzing a signal with a low frequency is certainly much simpler and less expensive than performing the same phase comparison at the microwave carrier frequency which is typically in the range of 10-101 GHz.

According to different aspects, said phase difference can be determined in different ways.

According to a first aspect, a Fast Fourier Transform, FFT, of each power signal is determined. The maximum amplitude frequency component in the FFT is then found, upon which the phase of this maximum amplitude frequency component can be determined. The two phases determined in this way are then compared to determine the phase difference.

Alternatively, according to a second aspect, the two power signals can be treated as signals in vector space. By using the formula for the inner product between first and second power signals $P_C$ and $P_D$, respectively, i.e., $P_C \cdot P_D = \|P_C\| \|P_D\| \cos(\theta)$, a relationship involving the phase difference is established. Solving for the angle $\theta$ gives the phase difference.

According to a third aspect, the phase difference is both determined and at the same time possible to visualize using the theory of Lissajous curves.

According to another aspect of the invention the microwave carrier frequencies injected to the transmitting antennas are swept over, e.g., the intended communication bandwidth of a future LOS-MIMO communication system, in order to investigate the frequency dependence of the optimal antenna deployment. Especially with large spatial separations between the antennas at each side or for non-rectangular geometries, it is likely that there is a significant variation in determined phase difference for different carrier frequencies, and this must be accounted for both when deploying antennas, and when commissioning the overall radio link system. I.e., if the operating frequency of the link can be chosen somewhat arbitrarily, the present teaching can be used for frequency selection in order to better optimize the radio link system performance. Here the transmitted signals $f_A$ and $f_B$ are preferably phase synchronously swept of some frequency range, which frequency range is much larger than the frequency difference $\Delta f$, and maintaining $\Delta f$ substantially fixed over the sweep range.

The output phase difference of the power signals can now be presented for different RF carrier frequencies in order to allow optimization of the link or for analyzing the MIMO system sensitivity to frequency variation. Towards this end, the control unit 115 of the radio transmitter 101 is arranged to be connected to 190 a presentation unit 175 at the radio receiver side. The connection 190 is according to aspects via different communication media. According to one aspect the connection is via radio communication between radio transmitter 101 and radio receiver 150. This connection 190 enables the radio transmitter 101 to share information with the radio receiver 150 which can be presented to a user of the system. According to one aspect the connection 190 is used to share the current values of the first and the second variable frequency.

Consequently, according to an aspect, the first tone and the second tone are generated from a common source tone at a third variable frequency.

It should be noted that even though most examples above relate to two spatial channels LOS-MIMO condition the invention can be applied to NLOS-MIMO systems and to systems with more MIMO channels, and also to systems making use of dual polarizations. The channels can then be tested individually by successively applying two different frequencies at two channels at a time, or by utilizing multiple frequencies providing different $\Delta f$ at the receivers.

As noted above, a main advantage obtained from the present teaching is that the optimality of a MIMO antenna deployment can be directly evaluated by using relatively simple and low cost components. Contrary to conventional DSP based estimation of phase differences from received data the present technique can also operate far from optimum conditions, i.e., for severely sub-optimal antenna deployments where a full MIMO system would not be able to function due to, e.g., a rank defect MIMO channel matrix.

The present teaching can, according to aspects, be applied in temporary use during planning or installation of a LOS-MIMO link or be built in permanently in the radio equipment for assisting during installation and for, e.g., fault tracing during normal operation of a radio system. Due to the simplicity of the concept all components required are usually already present in the existing hardware. The system can also be used for characterizing the time varying performance of a MIMO channel with respect to relative phase shifts, e.g., due to weather and environmental changes.

When the present system for evaluating MIMO antenna deployment is built in permanently in the radio equipment 101, 150, evaluation of antenna deployment is, according to aspects, made during normal operation of a radio system. I.e., the radio system transmits a payload signal in parallel with the transmitting of first 113 and second 114 signals, and receives the payload signal in parallel with receiving the first 163 and the second 164 composite signals.

The payload signal is preferably separated from the first 113 and from the second 114 signals, such that the different signals do not interfere with each other. According to various aspects of the present teaching, said separation is done in different ways.

In a first aspect the payload signal is transmitted in a first polarization, while the first and second signals are arranged to be transmitted in a polarization substantially orthogonal to the first polarization. Consequently, the payload signal and the signals used for antenna evaluation are configured to share the same frequency band, which is an advantage in terms of, e.g., transmission licensing.

In a second aspect the payload signal is transmitted in a first frequency band, while the first 113 and second 114 signals are transmitted in a frequency band, or in a set of frequency bands, different from the first frequency band. This is advantageous in that the signals can be separated from each other by using straight forward filtering techniques.

Thus, the present teaching, according to aspects, comprises a system for MIMO propagation phase estimation based on an antenna A transmitting an RF tone with a specified cycle, i.e., frequency f within a given frequency band specified for use by a future MIMO communication system. At the same time, an antenna B transmits an RF tone with slightly different cycle compared to that transmitted from antenna A, i.e. a frequency f+$\Delta$f. Receive antennas C and D are connected to power detectors, e.g., diodes, that detects the RF cycle difference from antennas A and B, i.e. the detectors output an electrical signal according to the difference in cycle between A and B, i.e. the frequency $\Delta$f. The phase difference in the output signals from antenna C and D constitutes a direct measure of the MIMO phase difference at the current carrier frequency.

Figure 2:
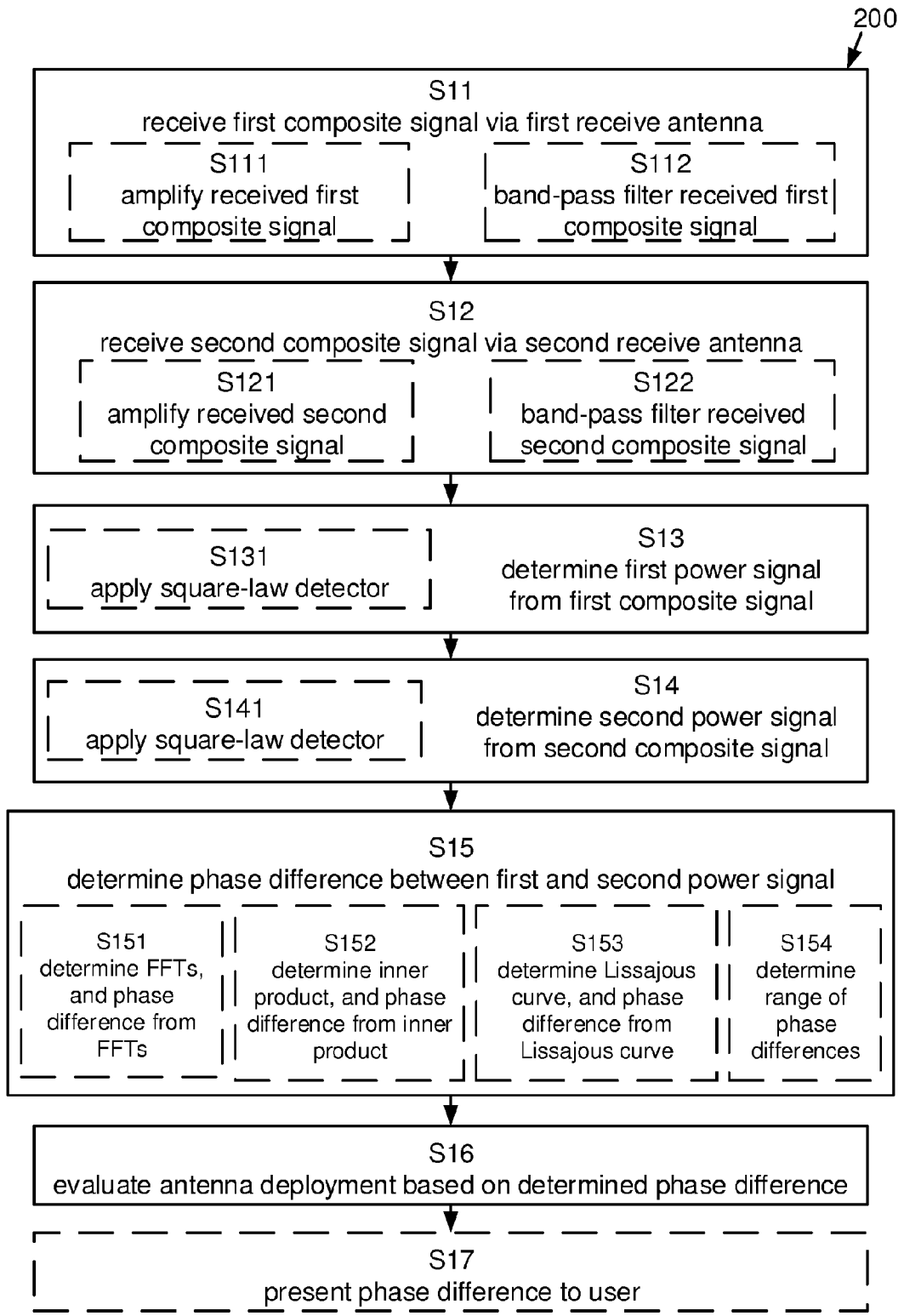
FIGS. 2-3 are flowcharts illustrating embodiments of methods of the disclosure.

FIG. 2 shows a flowchart illustrating embodiments of methods of the disclosure. In particular, a method 200, performed in a radio receiver 150, for evaluating multiple-input multiple-output, MIMO, antenna deployment, is illustrated. The method 200 comprises the steps of receiving S11 a first composite signal 163 via a first receive antenna 161. The first composite signal 163 comprising a first tone transmitted from a first transmit antenna 111 at a first variable frequency and a second tone transmitted from a second transmit antenna 112 at a second variable frequency different from the first variable frequency. The method 200 also comprises the step of receiving S12 a second composite signal 164 via a second receive antenna 162. The second composite signal 164 comprises the first tone transmitted from the first transmit antenna 111 and the second tone transmitted from the second transmit antenna 112. The method 200 also comprises the steps of determining S13 a first power signal 176 from the first composite signal 163, and determining S14 a second power signal 177 from the second composite signal 164. In addition, the method 200 comprises the steps of determining S15 a phase difference between the phase of the first power signal 176 and the phase of the second power signal 177 and also evaluating S16 MIMO antenna deployment based on the determined phase difference.

Thus, a given MIMO antenna deployment can, as has been made apparent from the present disclosure, be evaluated in a quick, cost-effective and precise manner, which is an advantage.

According to an aspect, the step of determining S13 a first power signal 176 comprises applying S131 a square-law detector to the first composite signal 163, and the step of determining S14 a second power signal 177 comprises applying S141 a square-law detector to the second composite signal 164.

According to another aspect, the step of receiving S11 a first composite signal 163 comprises amplifying S111 the received first composite signal 163, and the step of receiving S12 a second composite signal 164 comprises amplifying S121 the received second composite signal 164.

According to one aspect, the step of determining S15 a phase difference comprises determining S151 fast Fourier transforms, FFTs, of the first 176 and second 177 power signals, and determining the phase difference as the difference between a phase value of the FFT of the first power signal and a phase value of the FFT of the second power signal.

According to another aspect, the step of determining S15 a phase difference comprises determining S152 an inner product between the first and second power signals, and determining the phase difference from said inner product.

According to yet another aspect, the step of determining S15 a phase difference comprises determining S153 a Lissajous curve from a difference of the first and second power signals, and determining the phase difference from said Lissajous curve.

According to one aspect, the step of receiving S11 a first composite signal 163 and the step of receiving S12 a second composite signal 164 further comprises filtering by a first S112 and by a second S122 band-pass filter, respectively. The first and second band-pass filters are arranged to pass a first tone at a first variable frequency and a second tone at a second variable frequency.

According to another aspect, the method 200 also comprises the step of presenting S17 the determined phase difference between the first and second power signals to a user.

According to one aspect, the step of determining S15 a phase difference also comprises determining S154 a sequence of phase differences corresponding to a pre-determined sequence of first and second frequencies over a pre-determined frequency band.

Examples of executing the methods described above and shown in FIG. 2 was described in connection to FIG. 1, where a radio receiver 150 is shown.

Figure 3:
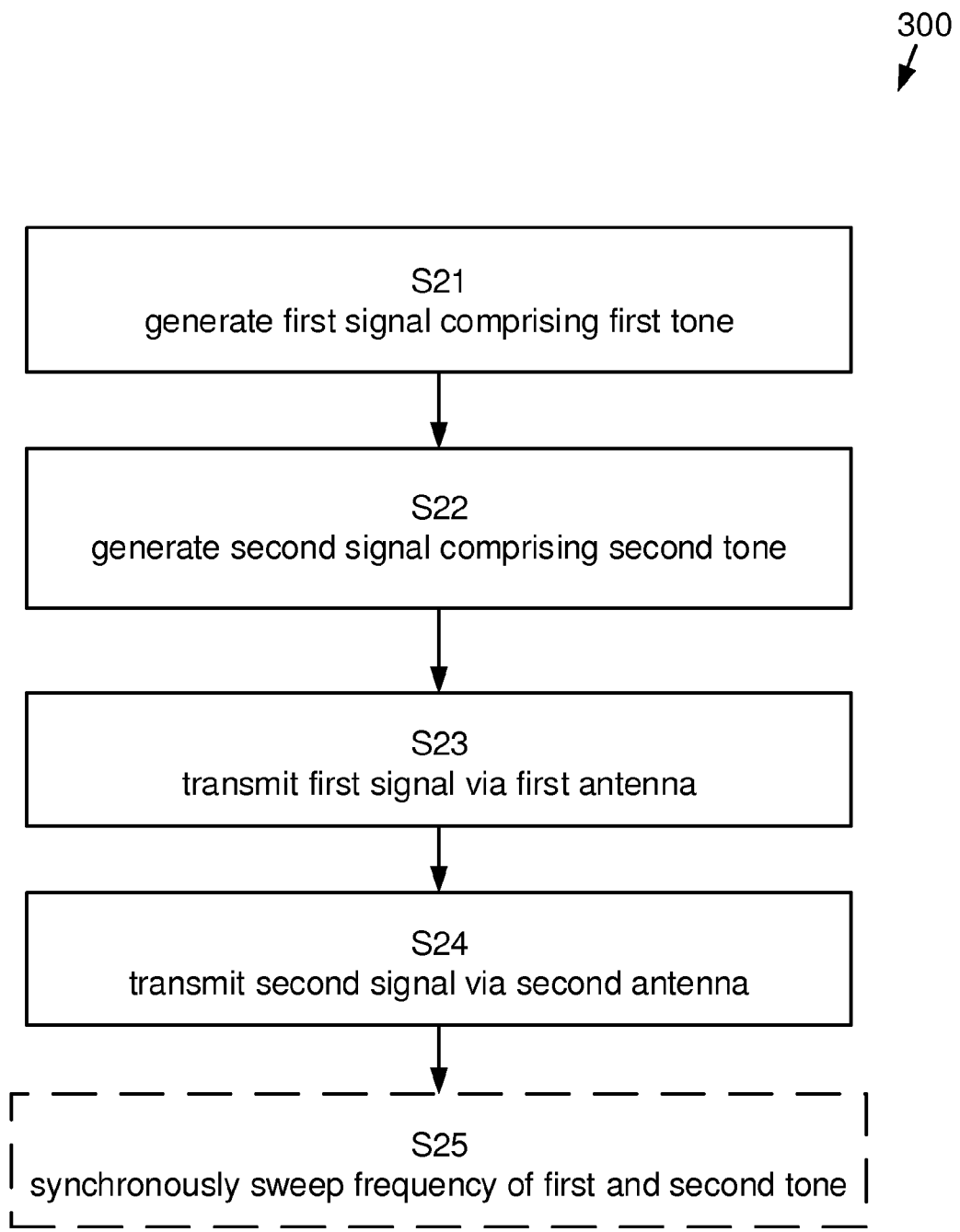

FIG. 3 shows a flowchart illustrating embodiments of methods of the disclosure. In particular, a method 300, performed in a radio transmitter 101 arranged for transmission of signals to a radio receiver 150, is shown. The radio receiver 150 is arranged for evaluating multiple-input multiple-output, MIMO, antenna deployment. The method 300 comprises the steps of generating S21 a first signal, the first signal comprising a first tone at a first variable frequency, and also generating S22 a second signal, the second signal comprising a second tone at a second variable frequency different from the first variable frequency. The method 300 further comprises the steps of transmitting S23 the first signal 113 via a first transmit antenna 111, and also transmitting S24 the second signal 114 via a second transmit antenna 112.

According to an aspect, the method 300 further comprises the step of sweeping S25 the first and second variable frequency synchronously over a pre-determined frequency band.

Examples of executing the methods described above and shown in FIG. 3 was described in connection to FIG. 1, where a radio transmitter 101 is shown.

The use of said first and second tones separated in frequency is advantageous in that the resulting received signal combinations, i.e., the first and the second composite signals, will have envelops which exhibit a beating, i.e., received signal magnitudes will vary deterministically with time. This beating is due to said separation in frequency between the first and the second tone, and can be analyzed in a quick and cost-effective manner and used to determine whether a given antenna deployment is suitable for MIMO communication or not.

Further, the disclosed methods can be applied to evaluate a given MIMO antenna deployment prior to a full MIMO system deployment, since it does not necessarily involve demodulating received composite signals, but merely determining first and second power signals from the received first and second composite signal. This is an advantage.

Also, the disclosed methods can be applied to evaluate MIMO antenna deployments which are severely sub-optimal, which is an advantage. This is again due to that no actual demodulation and detection of received composite signals is necessary, i.e., not MIMO signal processing is required for recovering transmitted data, but only the determining of first and second power signals, which is an advantage.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a radio receiver, for evaluating multiple-input multiple-output, MIMO, antenna deployment, the method comprising the steps of
receiving a first composite signal via a first receive antenna, the first composite signal comprising a first tone transmitted from a first transmit antenna at a first variable frequency and a second tone transmitted from a second transmit antenna at a second variable frequency different from the first variable frequency,
receiving a second composite signal via a second receive antenna, the second composite signal comprising the first tone transmitted from the first transmit antenna and the second tone transmitted from the second transmit antenna,
determining a first power signal from the first composite signal,
determining a second power signal from the second composite signal,
determining a phase difference between the phase of the first power signal and the phase of the second power signal,
evaluating MIMO antenna deployment based on the determined phase difference.

2. The method according to claim 1, wherein the first and second power signals constitute the envelopes of the first and second composite signals, respectively.

3. The method according to claim 1, wherein the first and second power signals constitute an even power of the envelopes of the first and second composite signals, respectively.

4. The method according to claim 1, wherein the step of determining a first power signal comprises applying a square-law detector to the first composite signal, and wherein the step of determining a second power signal comprises applying a square-law detector to the second composite signal.

5. The method according to claim 4, wherein at least one of the square-law detectors comprises a Schottky diode.

6. The method according to claim 4, wherein the at least one square-law detector is arranged to be mounted directly onto the corresponding receive antenna.

7. The method according to claim 1, wherein the step of receiving a first composite signal further comprises amplifying the received first composite signal, and wherein the step of receiving a second composite signal further comprises amplifying the received second composite signal.

8. The method according to claim 1, wherein the step of determining a phase difference comprises determining fast Fourier transforms, FFTs, of the first and second power signals, and determining the phase difference as the difference between a phase value of the FFT of the first power signal and a phase value of the FFT of the second power signal.

9. The method according to claim 1, wherein the step of determining a phase difference comprises determining an inner product between the first and second power signals, and determining the phase difference from said inner product.

10. The method according to claim 1, wherein the step of determining a phase difference comprises determining a Lissajous curve from a difference of the first and second power signals, and determining the phase difference from said Lissajous curve.

11. The method according to claim 1, wherein the step of receiving a first composite signal and the step of receiving a second composite signal further comprises filtering by a first and by a second band-pass filter, respectively, said first and second band-pass filters being arranged to pass a first tone at a first variable frequency and a second tone at a second variable frequency.

12. The method according to claim 1, further comprising the step of presenting the determined phase difference between the first and second power signals to a user.

13. The method according to claim 1, wherein the step of determining a phase difference further comprises determining a sequence of phase differences corresponding to a pre-determined sequence of first and second frequencies over a pre-determined frequency band.

14. The method according to claim 1, wherein the radio receiver constitutes part of a line-of-sight, LOS, MIMO communication system.

15. A radio receiver for evaluating a MIMO antenna deployment, the radio receiver comprising
a receiver arranged to receive a first composite signal via a first receive antenna, and also to receive a second composite signal via a second receive antenna, the first and the second composite signals comprising a first tone at a first variable frequency and a second tone at a second variable frequency different from the first variable frequency,
the receiver further comprising a first and a second detector, the first detector being arranged to receive the first composite signal from the first receive antenna, and to determine as well as to output a first power signal,
the second detector being arranged to receive the second composite signal from the second receive antenna, and to determine as well as to output a second power signal,
the receiver also comprising a processor arranged to receive the first and second power signals, and to determine a phase difference between the phases of the first and second power signals.

* * * * *